June 30, 1964 R. W. TREVERTON 3,138,995
FACE MILL CUTTER AND MACHINE FOR CUTTING GEARS
Filed Oct. 8, 1962 3 Sheets-Sheet 1

INVENTOR.
RICHARD W. TREVERTON

June 30, 1964 R. W. TREVERTON 3,138,995
FACE MILL CUTTER AND MACHINE FOR CUTTING GEARS
Filed Oct. 8, 1962 3 Sheets-Sheet 3

United States Patent Office 3,138,995
Patented June 30, 1964

3,138,995
FACE MILL CUTTER AND MACHINE FOR CUTTING GEARS
Richard W. Treverton, Rochester, N.Y., assignor to The Gleason Works, Rochester, N.Y., a corporation of New York
Filed Oct. 8, 1962, Ser. No. 229,023
15 Claims. (Cl. 90—5)

The present invention relates to an improvement in apparatus, for cutting gears and the like, of the general kind disclosed in Patent No. 2,913,962 granted November 24, 1959, to L. O. Carlsen and R. F. Pigage.

The cutter there disclosed has a series of roughing blades and two finishing blades arranged in a single circle of blades, with the finishing blades inset from the roughing blades and with a first gap between the last roughing blade and the first finishing blade and a second gap between the last finishing blade and the first roughing blade. In cutting each tooth slot the cutter makes several revolutions during which a roughing infeed is effected between the cutter and workpiece at such rate that only the roughing blades cut. Then, when the roughing infeed has been completed and the first gap is abreast of the work, an additional infeed is effected to relatively advance the finishing blades to cutting depth. After these finishing blades have cut, and while the second gap is abreast of the work, a relative withdrawal is effected between the cutter and workpiece, and the latter is indexed in preparation for cutting the next tooth slot.

The productivity of a cutter of this kind depends largely upon the number of roughing blades it contains, while its useful life depends upon the length of the blades, which determines the number of times the cutter can be resharpened. The number of roughing blades of given length that can be provided is severely limited by the aforementioned gaps between the roughing and finishing blades. Furthermore the cutter usually has a separate finishing blade for each side of the tooth slot, and a further gap of greater length than the slot is provided between these two blades in order that only one of them will be in the cut at one time. This further limits the space available for roughing blades.

The primary object of the present invention is to eliminate or at least substantially reduce these gaps, to thereby enable a larger part of the cutter circumference to be devoted to roughing blades, with corresponding increase in productivity or cutter life, or both. This object is accomplished by so arranging the cutter that the roughing and finishing blades may be brought alternately to the cutting position by relative movement between them, rather than, as before, by relative movement between the cutter and the workpiece. The roughing blades are rigidly interconnected as are also the finishing blades, so that each of these two sets of blades is brought to cutting position as a unit.

A preferred embodiment of the invention is shown in the accompanying drawings, wherein.

Figure 1:
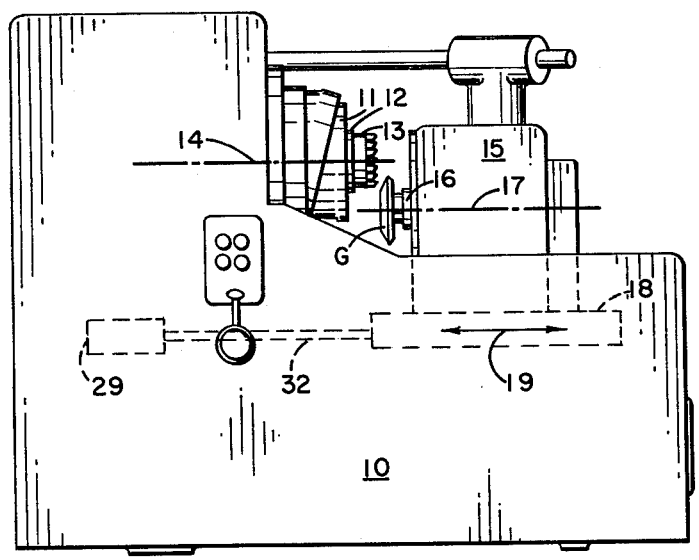
FIG. 1 is a side view of the gear cutting machine.

Referring to FIG. 1, the machine comprises a frame 10 having adjustable thereon a housing 11 in which a spindle 12 for face mill cutter 13 is journaled for rotation about axis 14. The frame also has adjustable thereon a housing 15 journaling a work spindle 16 for rotation about horizontal axis 17, the latter spindle supporting a work gear G, which in this illustration is a spiral bevel gear. Housing 15 is adjustable vertically, and also angularly about a vertical axis, upon a horizontal slide 18 which is movable along ways on the frame 10 in the direction of arrow 19. By adjustment of the housings 11 and 15 the machine may be adapted to cut a tooth slot of any desired spiral angle and depth in the gear G by relative infeed between the rotating cutter and the gear.

Figure 2:
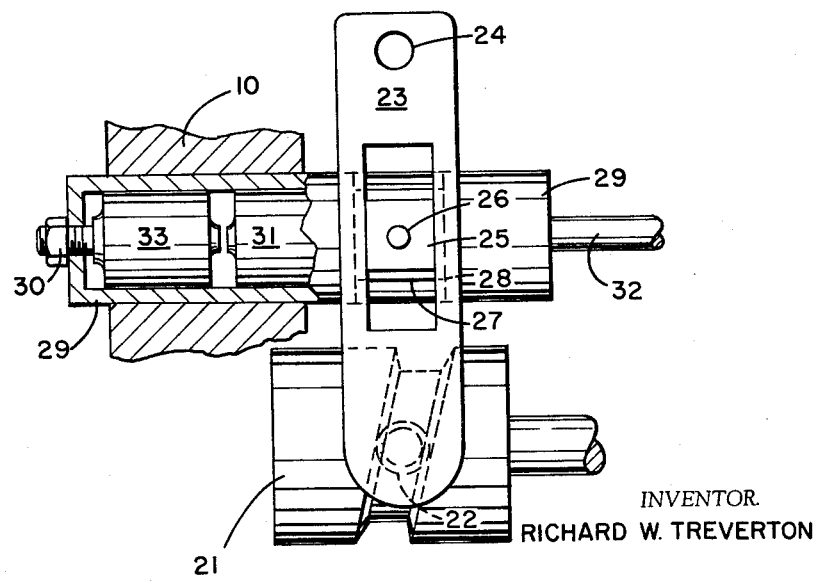
FIG. 2 is a schematic plan view, partly in section, of the feed mechanism of the machine.

The feed motion is effected by movement of slide 18 by means of a conventional feed cam 21, FIG. 2, which is connected by a motor-driven gear train, not shown, to the cutter spindle 12. One tooth space is cut during each revolution of the cam, the cutter during the same time making a number of complete revolutions which depends upon the gear ratio of the train. The cam has thereabout a continuous cam track engaged by a follower roller 22 carried by a lever 23 that is fulcrumed at 24 to the frame 10. A block 25 adjustable along the lever 23 (by suitable means, not shown) is pivoted at 26 to a block 27, and the latter is slidable back and forth along a guideway 28 in a cylinder member 29 that is reciprocable axially in the frame, such adjustment of block 25 serving to vary the stroke of the slide 18 effected by cam 21. A main piston 31 in the cylinder member is connected by a rod 32 to slide 18. An auxiliary piston 33 in the cylinder limits motion of piston 31 to the left. Piston 33 carries an adjustable stop 30 which limits its stroke in the cylinder.

At the start of operation, hydraulic fluid introduced into the right end of cylinder 29 moves the piston 31 to its extreme left limit position wherein it abuts piston 33, this action moving the slide 18 and gear G from a loading position to cutting position. The cam 21 is then rotated and acts through the lever 23, cylinder 29, piston 31 and rod 32 to move the slide 18 further to the left, effecting cutting infeed of the work gear in time with rotation of the cutter. At the end of the infeed a dwell in the cam holds the slide 18 in its full infeed position for a short time. Then the cam withdraws the slide, and, in preparation for a repetition of the cutting cycle, the gear G is indexed about axis 17 to bring a successive tooth space into cutting position. As is conventional, the indexing mechanism, not shown, is connected in the gear train to operate once per revolution of cam 21. After all of the tooth slots have been cut, the cam and cutter drive is stopped and hydraulic pressure is applied to the cylinder 29 between the two pistons 31, 33 to return the slide 18 to the right to loading position.

Figure 3:
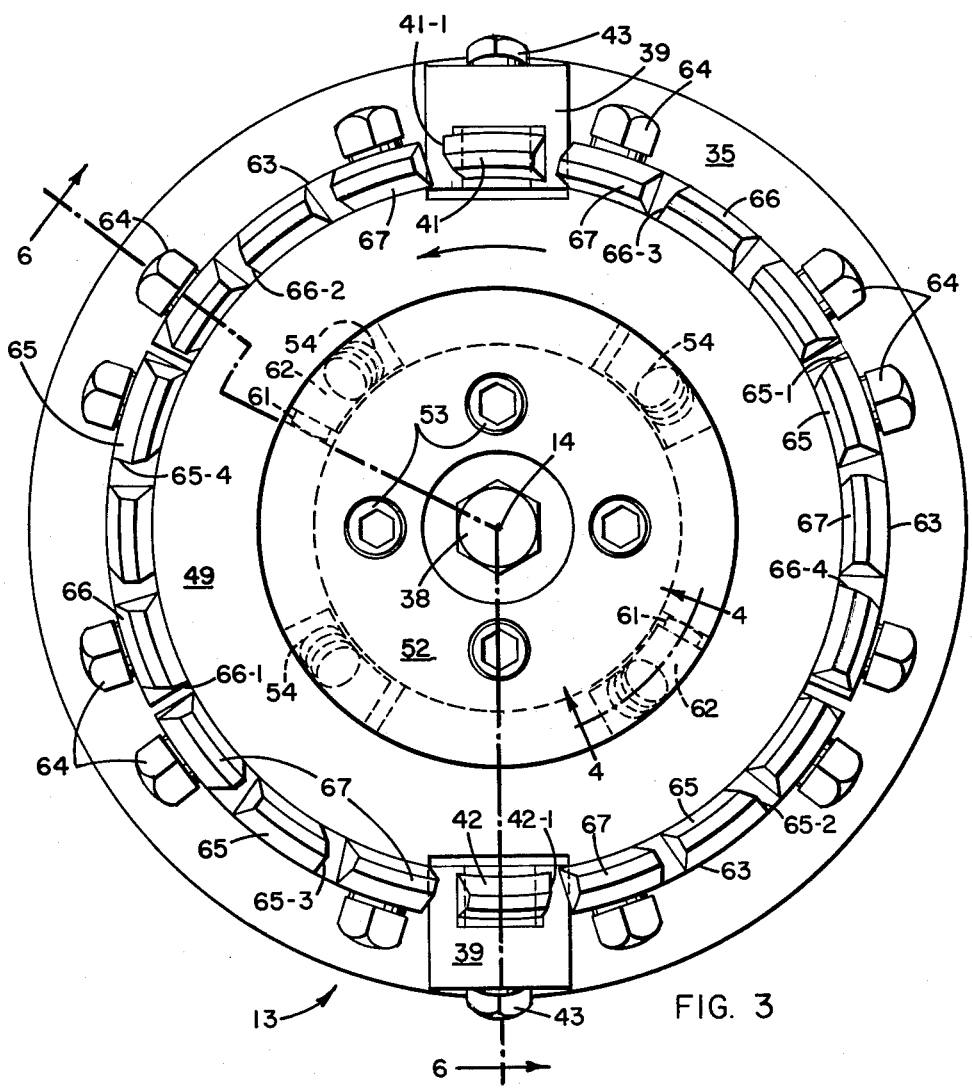
FIG. 3 is a front view of the cutter.
Figure 4:
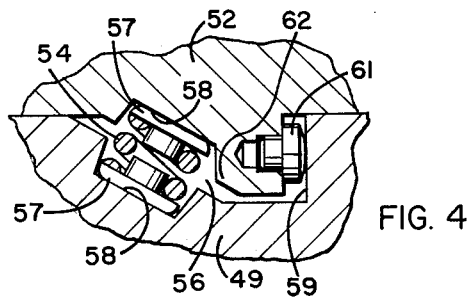
FIG. 4 is a detail sectional view as designated by section line 4—4 of FIG. 3.
Figure 6:
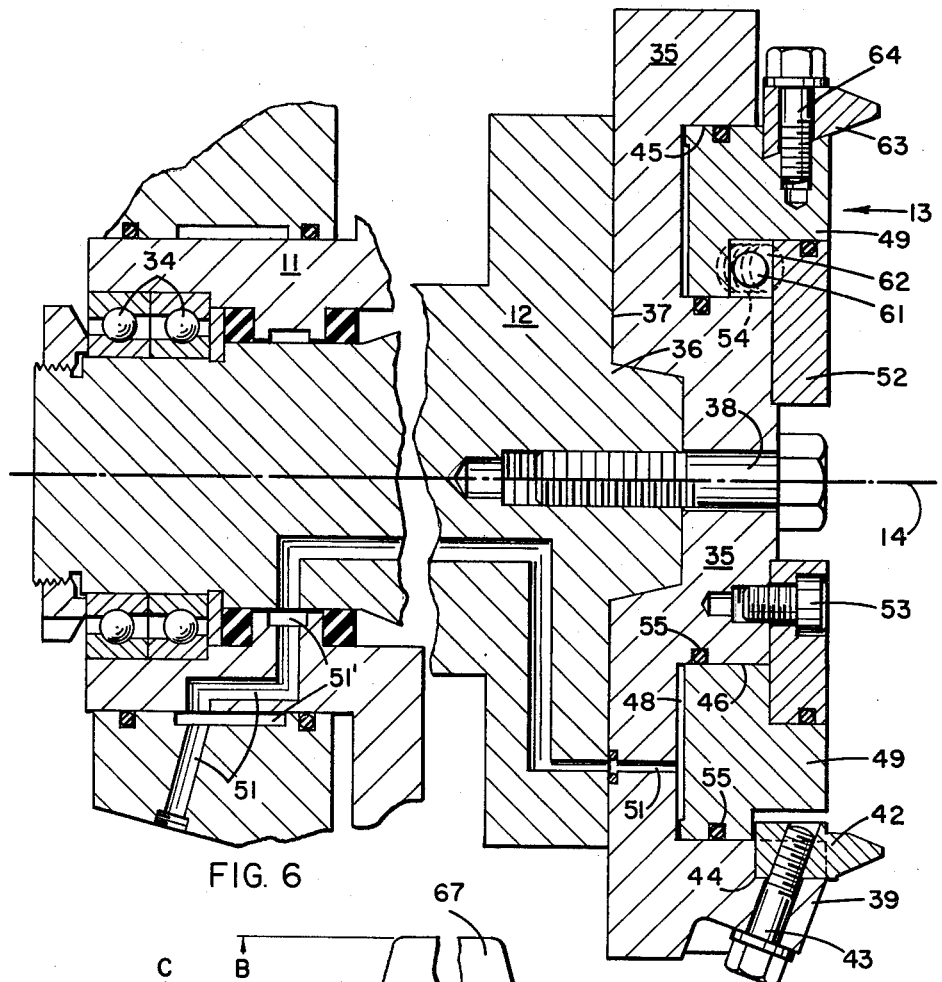

Referring to FIGS. 3, 4 and 6, the cutter spindle 12 is journaled in housing 11 on axially spaced pairs of antifriction bearings, the rear pair of which is designated 34. The cutter 13 comprises a drum-shaped body or head 35 seated on tapered center 36 and front face 37 of the spindle and secured thereon by a screw 38. On diametrically opposite sides of the cutter head are forwardly projecting lugs 39 whose inner faces are recessed to receive the shanks of finish cutting blades 41 and 42. Blade 41 is an outside-cutting blade, i.e. designed to cut primarily along its outside edge 41–1, while blade 42 is inside-cutting, with inside cutting edge 42–1. These blades are secured to lugs 39 by screws 43 which are inclined in order to draw the blades into the corners 44 of the recesses in the lugs.

An annular groove formed in the front face of the cutter head, in concentric relation to axis 14, has internal and external cylindrical surfaces 45 and 46 and bottom surface 47. The groove constitutes a piston chamber 48 in which an annular member 49 is slidable axially of the cutter. Advance of the annular piston member, to the right in FIG. 6, is effected by hydraulic pressure applied to the chamber through interconnecting passages 51 which extend through the housing 11 and spindle 12 and include annular grooves 51' for transmitting pressure between the relatively rotatable parts. Advance of the piston member is limited by abutment with a plate 52 which is secured to the central portion of head 35 by screws 53. In the absence of pressure in chamber 48, the piston member is moved rearwardly, to the left in FIG. 6, by compression springs 54 which, as shown in FIGS. 3, 4 and 6, are arranged to act between the plate 52 and the piston member 35. The latter preferably has a close sliding and centering fit with external cylindrical surface 46 of the piston chamber, and a somewhat looser fit with surface 45. These fits are made fluid tight by O-ring seals 55.

As best shown in FIG. 4 the springs 54 are disposed in recesses 56 in the front of the piston member 49, and have at their ends hardened steel buttons 57 which bear against recessed surfaces 58 of the plate and the piston member. These surfaces 58 are inclined relative to cutter axis 14 in a manner to cause the springs to exert a torque on the piston member opposite to the direction of cutter rotation. This torque serves to hold surfaces 59 of the recesses 56 in firm contact with hardened steel buttons 61 that are provided on each of two lugs 62 which project from diametrically opposite portions of plate 52 into the recesses. The buttons 61 transmit driving torque from the plate 52 to the piston member and, by being slidable upon surfaces 59, accommodate the aforedescribed axial motion of the piston member.

A plurality of segments 63 are secured by screws 64 to the periphery of piston member 49. In the illustrated embodiment each segment has three roughing blades integral therewith. These blades are arranged in the same blade circle about the cutter axis 14 as the finishing blades 41, 42, and they comprise outside cutting blades 65, inside cutting blades 66, and, between each adjacent pair of outside and inside cutting blades, a tooth bottom cutting blade 67.

Figure 5:
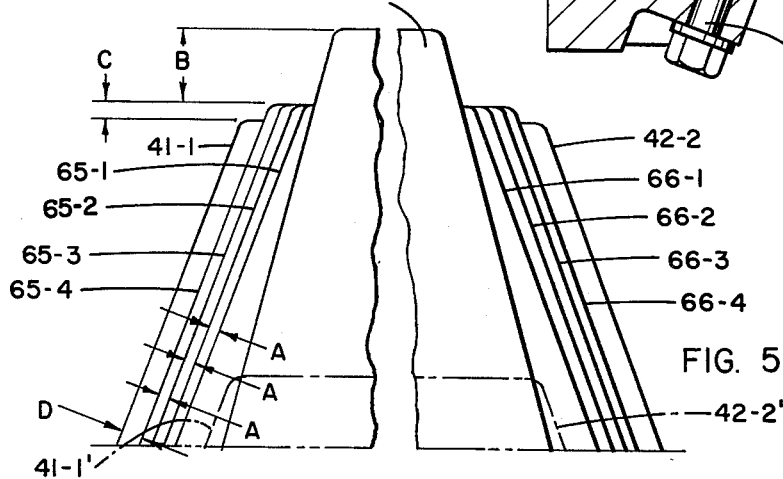
FIG. 5 is a magnified diagrammatic view showing the relationship of the cutting edges of the several blades when all of them have been rotated about the cutter axis into the same plane; and, FIG. 6 is a sectional view of the cutter and its supporting spindle approximately in the axial planes designated 6—6 in FIG. 3.

The relative positions of the several cutting edges are shown in FIG. 5. Since the outside and inside roughing blades 65 and 66 cut while there is a substantially constant relative infeed approximately along axis 14 effected by cam 21, and since, as shown in FIG. 3, one outside and one inside roughing blade is omitted from the circle of blades to provide spaces for finishing blades 41 and 42, the remaining side cutting roughing blades are stepped in order to equalize the chip load on them. For example, assuming a roughing infeed at a rate such that the side cutting edges would remove stock from the tooth sides of a thickness of 0.020 inch per revolution of the cutter, the outside cutting edges 65–2, 65–3 and 65–4 would be respectively outset from the preceding edges 65–1, 65–2 and 65–3 by a dimension A equal to 0.001 inch, so that each blade would remove 0.005 inch of stock, whereas without such stepping the blades 65–2, 65–3 and 65–4 would each remove only 0.004 inch of stock and the blade 65–1, following after the outside roughing blade omitted in favor of blade 41, would remove 0.008 inches. For the same reason inside roughing blade edges 66–1 to 66–4 are similarly stepped.

No such stepping of the bottom cutting blades 67 is necessary in the illustrated cutter for the reason that none of them is omitted from the blade circle. As shown, these blades preferably project axially beyond the side cutting roughing blades by a distance B on the order of 0.010 inch, while the finishing blades are preferably inset axially by a smaller distance C, on the order of 0.003 inch, when the piston member 49 is in its rearward limit position. In this condition the finish side cutting edges 41–1 and 42–1 are respectively outset and inset from the preceding roughing blades 65–4 and 66–4 by the desired thickness D of the finishing cut, in this instance about 0.002 inch. When the piston member is in its forward limit position the edges of the finishing blades are substantially inset and outset, relative to the roughing blades, as shown at 41–1' and 42–2' respectively. Stop 39, FIG. 2, is so adjusted that the stroke of piston 33 is equal to that of piston member 49.

The machine is provided with valve means (not shown) which control the application of hydraulic pressure to passages 51 and to the left end of cylinder 29, these valve means operating in time with feed cam 21. The timing is such that the following action is obtained: While the cam is infeeding the slide 18 and work gear G, pressure is maintained in passages 51 and chamber 48, so that the roughing blades are held in their advanced or cutting position, and pressure is also maintained in the left end of cylinder 29 so that the piston 33 is held in its right limit position shown in FIG. 2. When the tooth slot has been cut to full depth, in which the infeed dwell portion of cam 21 is effective, and the roughing blade edges 65–4 and 66–4 have taken their final cuts, pressure to passage 51 and to the left end of cylinder 29 is released, so that the piston member 49 and the roughing blades are retracted, and the piston 33 is moved into abutment with the left end wall of cylinder 29 by the pressure applied against the right face of piston 31, so that the work gear is positioned for finish cutting by blades 41, 42. As soon as this finish cutting has been accomplished, the feed cam withdraws the slide 18 preparatory to indexing the work spindle to bring an uncut tooth space of work gear G into position for cutting, and pressure is reapplied to passages 51 and the left end of cylinder 29.

In a typical case the cam 21 may be arranged to make one full turn for each sixteen turns of the cutter, and have around its periphery (a) an infeed section of 270°, (b) an infeed dwell section of 45° for finish cutting, and (c) a withdrawal and withdrawn dwell section of 45° for indexing. The infeed may begin approximately when edge 66–1 is abreast of the work and the transition to infeed dwell occur after twelve full turns of the cutter. The relative shifting to bring the finishing blades into cutting position may take place one cutter turn later (at the end of thirteen complete turns) and the relative withdrawal by the cam for indexing of the workpiece at the end of the fourteenth turn. At the end of the sixteenth turn of the cutter the indexing is completed and a repetition of the cutting cycle may begin.

Having now described the preferred embodiment of my invention, and its mode of operation, what I claim is:

1. Apparatus for cutting gears and the like comprising a face mill cutter having a rotatable body rigidly supporting a pair of circumferentially spaced finishing blades, a member connected to the body for rotation therewith and for limited motion relative thereto along the axis of rotation, said member rigidly supporting a plurality of roughing blades, said roughing and finishing blades being arranged in the same blade circle about said axis, the roughing blades having side cutting edges which are offset, relative to the side cutting edges of the finishing blades, to cutting position and to non-cutting position respectively when said member is in its forward limit position and its rearward limit position relative to said body, and means for effecting said relative axial motion between said member and body.

2. Apparatus according to claim 1 in which roughing blades are interposed between the finishing blades in the blade circle.

3. Apparatus according to claim 2 in which the finishing blades are diametrically opposed in the blade circle, each finishing blade being preceded and followed in said circle by roughing blades.

4. Apparatus according to claim 1 in which said means for effecting relative axial motion comprises a fluid operable piston and piston chamber provided on said body and member.

5. Apparatus according to claim 4 in which the piston is of annular form and movable as a unit with said member, said piston chamber is of annular form and in said body, the piston being adapted to be moved to and clamped in its forward limit position by fluid pressure, and there are spring means for effecting movement of the piston to its rearward limit position upon release of such pressure.

6. Apparatus according to claim 5 in which said member and body have abutments for transmitting drive torque therebetween and said spring means are arranged to maintain said abutments in contact.

7. Apparatus according to claim 6 in which said spring means comprise a plurality of compression springs spaced from each other around the cutter axis and each arranged to act between the said body and member in a direction inclined to the cutter axis in the sense to urge said abutments into contact.

8. Apparatus according to claim 1 comprising a machine having a cutter spindle supporting the cutter body, a work spindle for supporting a workpiece, and feed means for effecting relative infeed, dwell and return motions between said spindles in a direction approximately depthwise of a tooth space being cut, said feed means being adapted to effect infeed while said member of the cutter is in its said forward limit position and to dwell while said member is in its said rearward limit position, and means for effecting a further relative advance and withdrawal between said spindles, also in said direction, respectively upon rearward and forward movements of said member relative to said body.

9. Apparatus for cutting gears and the like comprising a face mill cutter having a rotatable body rigidly supporting a set of inside and outside cutting blades, a member movable on the body and rigidly supporting another set of inside and outside cutting blades in approximately the same circle about the axis of rotation of the body as the first-mentioned blades, and means operable during rotation of the cutter for moving said member back and forth on the body to offset both the inside and outside cutting blades of the member-supported set of blades, relative to the corresponding blades of the body-supported set of blades, to cutting position and to non-cutting position.

10. Apparatus according to claim 9 in which there are means operable during rotation of the cutter for clamping said member to said body in the position wherein the member-supported blades are in cutting position.

11. Apparatus according to claim 9 in which one set of blades comprises one inside cutting blade and one outside cutting blade, and blades of the other set are interposed in said circle between said inside cutting blade and said outside cutting blade.

12. Apparatus according to claim 11 in which said inside cutting blade and said outside cutting blade are supported by said body.

13. Apparatus according to claim 11 in which said inside cutting blade and said outside cutting blade are arranged in substantially diametrical opposition to each other in said circle.

14. Apparatus according to claim 11 in which the blades of one set are interposed between blades of the other set.

15. Apparatus for cutting gears and the like comprising a face mill cutter having a rotatable body rigidly supporting a first set of blades, a member connected to the body for rotation therewith and for limited axial motion relative thereto along the axis of rotation, said member rigidly supporting a second set of blades, the blades of both sets being arranged in substantially the same blade circle about said axis, the blades of the second set having side cutting edges which are offset, relative to the side cutting edges of the blades of the first set, to cutting position and to non-cutting position respectively when said member is in its forward limit position and its rearward limit position relative to said body, and means for effecting said relative axial motion between said member and body.

References Cited in the file of this patent
UNITED STATES PATENTS

| | | |
|---|---|---|
| 1,398,477 | Tibbetts | Nov. 29, 1921 |
| 2,126,262 | Johanson | Aug. 9, 1938 |